US005580622A

United States Patent [19]
Lockshaw et al.

[11] Patent Number: 5,580,622
[45] Date of Patent: *Dec. 3, 1996

[54] STRUCTURAL ELEMENT WITH RIBBING MECHANICALLY BLOCKED AGAINST SEPARATION

[75] Inventors: James J. Lockshaw, Huntington Beach; Stephen Kelly, Yorba Linda; Randall Walker, Santa Ana; John Kaiser, Jr., Huntington Beach, all of Calif.

[73] Assignee: Tolo, Inc., Irvine, Calif.

[*] Notice: The term of this patent shall not extend beyond the expiration date of Pat. No. 5,273,806.

[21] Appl. No.: 332,516

[22] Filed: Oct. 31, 1994

Related U.S. Application Data

[63] Continuation-in-part of Ser. No. 173,611, Dec. 27, 1993, Pat. No. 5,487,930.

[51] Int. Cl.⁶ .................................................. B32B 3/00
[52] U.S. Cl. .................. 428/34.1; 428/36.1; 428/36.3; 428/36.9; 428/53; 428/120; 428/167; 428/172; 428/178; 52/793.1; 52/793.11
[58] Field of Search ..................... 428/120, 119, 428/178, 53, 33, 167, 172, 188, 273, 593, 34.1, 36.1, 36.3, 36.9; 52/793.1, 793.11

[56] References Cited

U.S. PATENT DOCUMENTS

| | | | |
|---|---|---|---|
| 4,304,821 | 12/1981 | Hayase et al. | 428/593 |
| 4,957,788 | 9/1990 | Colonel et al. | 428/167 |
| 5,273,806 | 12/1993 | Lockshan et al. | 428/167 |

*Primary Examiner*—Donald J. Loney
*Attorney, Agent, or Firm*—Louis J. Bachand

[57] ABSTRACT

A structural element suitable for walls, tanks and bulkhead structures comprising opposed, axially extended surface structures and ribbing interposed therebetween in freely movable relation responsive to a temporary first relative dimensional condition of the surface structures and ribbing, and in blocking relation against separation of the surface structures responsive to a persistent second relative dimensional condition of the surface structures and ribbing.

43 Claims, 2 Drawing Sheets

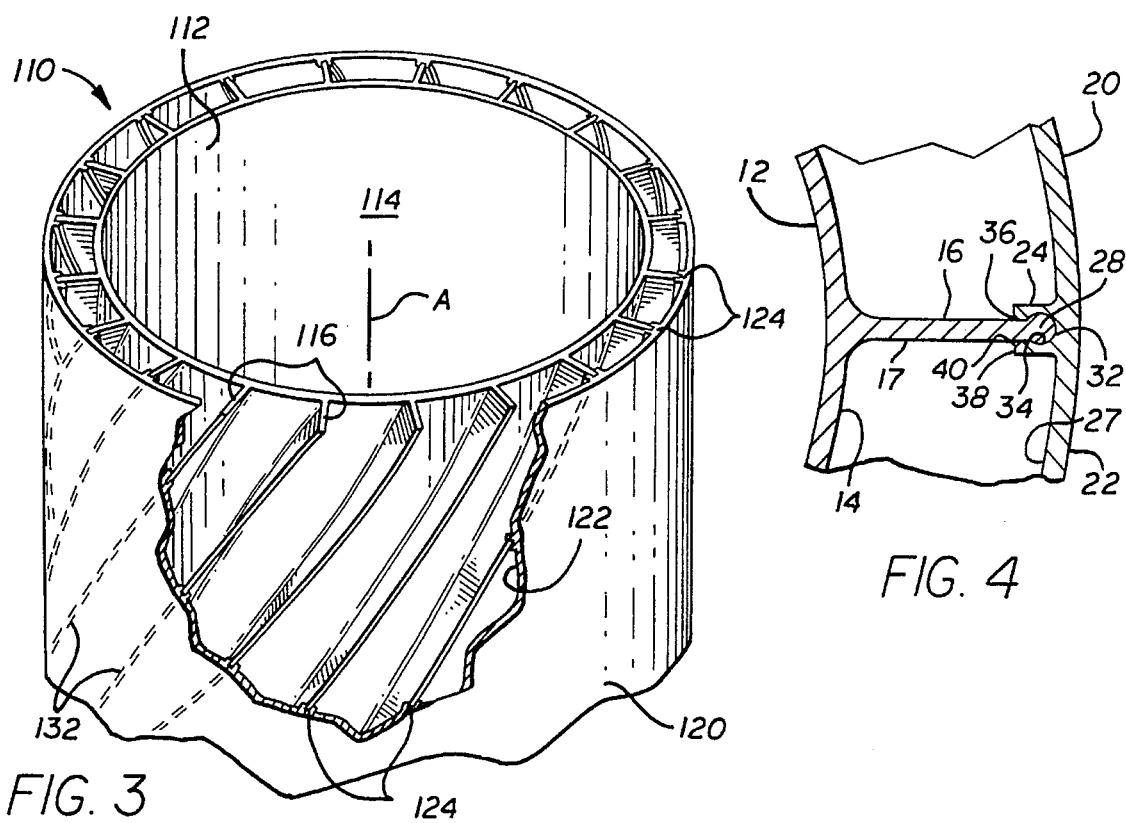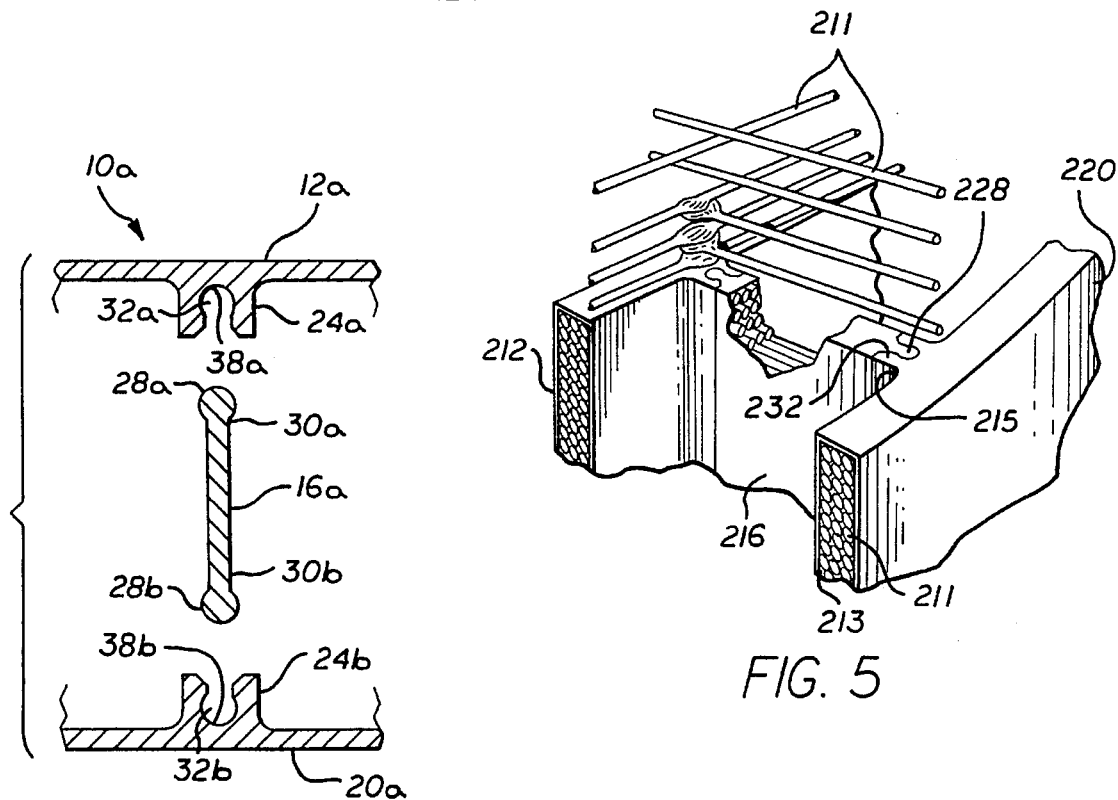

STRUCTURAL ELEMENT WITH RIBBING MECHANICALLY BLOCKED AGAINST SEPARATION

REFERENCE TO RELATED APPLICATION

This application is a continuation in part of our application Ser. No. 08/173,611, filed Dec. 27, 1993 now U.S. Pat. No. 5,487,980.

FIELD OF THE INVENTION

This invention relates to structural elements, ranging from aircraft components to enclosures, which are lightweight, extremely strong, widely variable in size, configuration and material of construction, easy to manufacture with widely available equipment, and free of the problems associated with other forms of structural elements serving some of the same purposes, such as honeycomb panels.

More particularly, this invention relates to structural elements having first and second axially extended surface structures spaced by ribbing mounted to said structures free of bonding agents, the ribbing being mechanically blocked against separation from the surface structure or unblocked for separation as a function of dimensional changes relatively between the ribbing and the surface structure ribbing mounting, e.g. temperature responsive expansion of the mounting and shrinkage of the ribbing.

BACKGROUND

Aircraft components including engine intake ducts, flooring and wing sections are frequently made of honeycomb material which is lightweight, rigid and capable of being fabricated in many shapes. Honeycomb is, however, expensive, difficult to work with, problematic when contour changes are required, awkward to attach other parts to, and not readily repairable. These drawbacks to honeycomb structural elements have been met by reinforcing the element where other parts are to be mounted, by adding brackets at junctions of internal members and, in general, beefing up the structural element, all at the cost of increasing its weight, thus lessening the most significant putative advantage of the honeycomb.

Honeycomb further suffers the disadvantage of using bonding agents such as resin adhesives to bond the components together. Bonded together structural elements have increased material costs, possible bonding failures, and more complex and, thus, more expensive construction procedures.

SUMMARY OF THE INVENTION

It is an object, therefore, of the present invention to provide a structural element which affords the advantages of honeycomb but avoids the disadvantages. It is another object to provide a structural element which is widely variable in size and contour with no great change in manufacturing complexity or cost, which is lightweight while offering great strength, which is readily repaired, and which affords easy attachment of other components with no special post manufacturing steps. It is another object to provide increased ease of machining or otherwise fabricating the component structures, by using a ribbing integrally formed with or separately formed from the first and second structures. It is further an object to provide structural elements in which no bonding adhesives are required, and in which the connection of parts is through mechanical interlocking. The mechanical interlocking is typically achieved through the divergent dimensional response of the locking parts under temporarily selected conditions. Thus interfittable parts are brought to different temperatures, e.g. on opposite sides of ambient temperature so that the physical dimensions of each of parts to be locked together are slightly increased and decreased respectively, for fitting together. Then the parts are returned to a predetermined e.g. ambient temperature condition, and they return to their normal dimensions at such temperature condition, but now interlocked against separation.

These and other objects of the invention, to become apparent hereinafter, are realized in a structural element comprising opposed first and second axially extended surface structures, a pattern of ribbing extending between and spacing the surface structures, ribbing mounting means on the surface structures in registered relation with the ribbing, the ribbing being mechanically blocked against separation from the ribbing mounting means when the mounting means and ribbing are each at a predetermined temperature condition and mechanically unblocked when the mounting means and ribbing deviate differentially, i.e. vary in different directions or in the same direction but at different rates, from the predetermined temperature condition.

In this and like embodiments, typically, the first and second surface structures generally lie in parallel planes; the first and second surface structure planes are congruent; the first and second surface structures generally lie in cylindrical planes; the first and second surface structures in the cylindrical planes are congruent; the first and second surface structures in the cylindrical planes are coaxial; the ribbing mounting means on at least one of the first or second surface structures is integral with the surface structure; at least one of the first or second surface structures is locally relieved to define the ribbing mounting means; both of the first and second surface structures are locally relieved to define the ribbing mounting means; the ribbing is formed by local relief of the first or second surface structure; and the ribbing comprises individual ribbing segments formed independently of both the surface structures.

In a preferred embodiment, the first and second surface structures lie in nested cylindrical planes, and the ribbing comprises plural ribbing segments helically disposed between the surface structures in engaged relation with the ribbing mounting means on each surface structure; the first and second surface structures lie in nested cylindrical planes, and the ribbing comprises circularly disposed plural ribbing segments lying radially of the center longitudinal axis of the inner of the cylindrical planes and between the surface structures in engaged relation with the ribbing mounting means on each surface structure.

In a further preferred embodiment, the first and second surface structures lie in generally parallel planes, and the ribbing comprises plural ribbing segments disposed generally normal to at least one of the surfaces structures and in engaged relation with the ribbing mounting means.

In this and like embodiments, typically, the ribbing mounting means on at least one of the first or second surface structures is integral with the surface structure; at least one of the first or second surface structures is locally relieved to define the ribbing mounting means; both of the first and second surface structures are locally relieved to define the ribbing mounting means; the ribbing is formed by local relief of the first or second surface structure; the ribbing comprises individual ribbing segments formed independently of both the surface structures; the mounting means and plural ones of the ribbing segments define interfitting portions; and the ribbing segments have at least one bulbous terminal opposite the mounting means therefor, the mounting means defining a cup-shaped recess congruent with the bulbous terminal and relatively sized with respect thereto such that at the same temperature condition the mounting means and the ribbing terminal engage one another in blocking relation against relative movement, but at relatively different temperature conditions of the mounting means and the ribbing terminal they are relatively movable in unblocked relation.

In a further embodiment, the invention structural element comprises opposed first and second, axially extended surface structures each having a closed figure pattern of ribbing projecting therefrom toward the opposite surface structure in spaced relation, the ribbing being interposed between the first and second surface structures in freely movable relation responsive to a temporary first relative dimensional condition of the structures, and in blocking relation against separation of the structures responsive to a persistent second relative dimensional condition of the structures.

In this and like embodiments, the structures are dimensionally responsive to heat conditions and the persistent second relative dimensional condition of the structures and ribbing exists at 25° C. and the first relative dimensional condition exists independently in the first and second structure and the ribbing at some other temperature; the surface structure ribbing defines mounting means and there is also included a third ribbing structure bridging the space between the surface structures in registered, mating relation with the surface structure ribbing mounting means; the third ribbing structure is separately formed from the surface structures; the third ribbing structure defines a closed figure registerable with the first and second surface structure closed figure patterns of ribbing mounts; the third ribbing structure closed figure comprises linear segments; the third ribbing structure closed figure comprises curvilinear segments; the third ribbing structure is of relatively greater height than the pattern of ribbing mounts on the first or second surface structures; the surface structure ribbing mount of at least one of the first and second surface structures defines an outward edge groove into which the opposing outward edge of the third ribbing structure interfits in structural element defining relation; and/or both of the first and second surface structure ribbing mounts define an outward edge groove to receive the third ribbing structure.

In a further embodiment, the invention provides a structural element comprising opposed first and second, axially extended, surface structures each having a closed figure pattern of ribbing mounts projecting therefrom toward the opposite surface structure in spaced relation, and a separately formed third ribbing structure shrink-fit-locked between the first and second surface structures.

In this and like embodiments, typically the third ribbing structure comprises a closed figure of a plurality of linear segments arranged to enclose a space; the third structure comprises a closed figure of curvilinear segments arranged about a common point to enclose a space; the third ribbing structure comprises fiber reinforced plastic; and the first and second surface structures each comprise fiber reinforced plastic and at least one surface structure is integrally formed with the ribbing against unblocking except upon melting of the plastic.

Accordingly, the invention provides a structural element comprising first and second surface structures, one of the surface structures defining a closed pattern of ribbing, the other of the surface structures defining a cooperating pattern of ribbing for locking together the surface structures in spaced relation.

The invention further contemplates the method of supporting opposed surface structures in a structural element spaced by a pattern of ribbing, including interposing ribbing between the surface structures in a temporary first relative dimensional condition of the structures and ribbing in interfitting relation, and thereafter returning the surface structures and ribbing to a persistent relative dimensional condition to interlock the structures together across the ribbing by said dimensional change.

BRIEF DESCRIPTION OF THE DRAWINGS

The invention will be further described in conjunction with the accompanying drawing in which:

FIG. 3 is a view like FIG. 1, showing a structural element with helical ribs.

FIG. 4 is a detail view, somewhat enlarged, taken on line 4 in FIG. 1;

FIG. 5 is a detail view, partly exploded and enlarged, taken on line 5 in Fig.2;

FIG. 6 is a view like FIG. 4 showing an alternative ribbing and planar surface structure arrangement,

PREFERRED MODES

Figure 1:
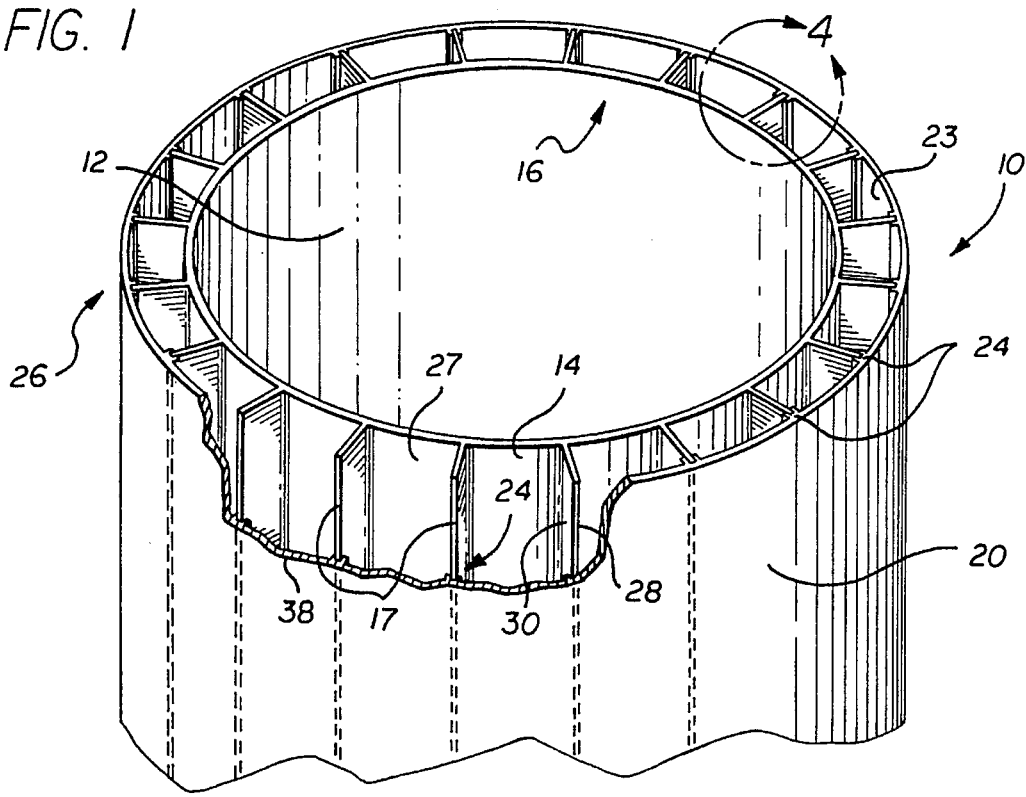
FIG. 1 is a perspective view of a cylindrical structural element having straight ribs according to the invention.

The term "temperature condition" herein refers to the presence of more or less heat in the surface structures and/or ribbing without reference to any absolute level of such heat. What is important is the differential in temperature between the parts to be mated, not the existence of any particular temperature in either part. Most structural elements will be used at a known use temperature or temperature range, and this use temperature range is called ambient herein whether such temperature is room temperature or some other temperature. Ambient temperatures, however, and typically, are conveniently room temperature, or more precisely 25° C. and the parts to be mated are varied from that temperature differentially to have a change in relative dimension so as to permit interfitting of parts which would not fit together were they each at the same temperature, but which can be dimensionally shifted by differentially changing their temperature. For this purpose, surface structures, mounts thereon and ribbing are desirably formed of materials which are so dimensionally shiftable.

The term "a pattern of ribbing" herein refers to ribbing which when viewed in plan or elevation presents a regular or irregular even random but repeating arrangement of ribbing. A "closed figure pattern of ribbing" herein refers to a series of laterally and/or longitudinally adjacent closed figures of ribbing forming a pattern. A "closed figure" of ribbing is one in which a straight line drawn anywhere through the figure will intersect ribbing in at least two places, and includes a circle, triangle and rectangle in which adjacent segments of ribbing are contiguous, as well as circular and rectangular spirals and other figures wherein although the ribbing segments are arranged about a common point and adjacent segments are not always contiguous, a straight line drawn anywhere through the figure will intersect ribbing in at least two places. A figure in which all sides are in continuing contact at the same or different distances from a common locus within the figure is the preferred form of a closed figure.

"Mechanically blocking" herein refers to a condition where one part interferes with the movement of another part interfitted therewith by bodily contacting the other part in a manner which blocks relative movement, as by an overhang or enclosure, full or partial, by one part of the other. "Unblocking" refers to the removal of a blocking condition. Where the establishment of a blocking condition is accomplished by increasing the dimensions of a receiving part relative to a received part, as by heating the former and cooling the latter from ambient temperature, the mechanical blocking results from a return to ambient by the treated parts. The shrunken-by-cooling received part placed within the expanded-by-heat receiving part expands just as the receiving part contracts about the received part. The received part bodily engages the receiving part and vice-versa such that they interfit so closely that they cannot be separated and still maintain the integrity of the parts.

With reference to the drawings, in FIGS. 1 and 4 a structural element 10 is shown comprising a first or inner surface structure 12 comprising a generally cylindrical surface portion 14 and fixed thereto or preferably machined thereinto from a metal mass unitary with the surface portion an integral pattern of ribbing 16 circumferentially arranged as a series of axially aligned fins 17 extending outward from the surface portion. The structural element 10 further comprises a second or outer surface structure 20 comprising a generally cylindrical surface portion 22 in which inner surface structure 12 of lesser diameter is nested. Fixed to or machined into the inner face 23 of the outer surface structure 20 by locally relieving a metal mass unitary therewith is an integral pattern of ribbing mounts 24 arranged opposite and complementary to the ribbing 16 as a circumferential disposed series 26. The ribbing 16 and mounts 24 may be reversely located with the mounts located on the outer face 27 of the inner surface structure 12 and the ribbing 16 on the face 23 of the outer surface structure 20. cf. FIG. 6 to be described hereinafter.

The ribbing 16 and mounts 24 define terminal interfitting portions, i.e. a radially enlarged bead 28 formed along the outward edge 30 of ribbing 16, bulbous in cross section, and a radially enlarged channel 32, cup-shaped in cross section, formed along, i.e. within the inward edge 34 of mounts 24 inside of gap 36 in the inward edge. With reference particularly to Fig. 4, it will be seen that ribbing bead 28 is oversized relative to the gap 32 but generally congruent with the channel 32. The walls 38 forming gap 36 are cammed at 40 to ease the entry of bead 28 and spaced such that entry of the bead is a free passage or an overcenter process in which the bead is closed upon after its midpoint passes through the midpoint of the gap 32, to be seated in the channel 32.

To effect coincidence of the channel 32 and bead 28, the bead-carrying ribbing 16, as the male portion of the connection, is cooled from ambient temperature thereby shrinking its physical dimensions. The mounts 24, as the female portion of the connection, are heated above ambient temperature to cause channel gap 36 and the channel 32 beyond to widen sufficiently to pass and receive respectively the ribbing bead 28. Return of the ribbing 16 and mounts 24 to ambient temperature causes the channel 32 to close about the bead 28 with the channel wall 42 overlying the bead such that the ribbing cannot be removed without breaking the channel walls 38 forming the gap 36. The channel 32 thus bodily interferes with separation of the ribbing 16 from the mounts 24 and mechanically blocks separation of the parts.

The ribbing 16 and mounts 24 can be separated by reversing the assembly process while repeating the above-described heating and cooling steps to effect the necessary changes in relative dimensions of the interfitting parts.

In FIG. 6 a portion of a planar structural element is shown at 10a having an alternative ribbing and mounting arrangement. There ribbing 16a is a third ribbing structure separately formed from the inner surface structure 12a and the outer surface structure 20a. Ribbing 16a is dumbbell shaped with its edges 30a and 30b respectively provided with beads 28a, 28b. Surface structures 12a and 20a are provided with integrally formed mounts 24a and 24b having channels 32a and 32b and channel walls 38a, 38b which function like mounts 24 in the FIGS. 1 and 4 embodiment to capture the ribbing 16a by its edges 30a and 30b and thereby secure the three element structure of the inner surface structure 12a, the outer surface structure 20a and ribbing 16a together without adhesives or any bonding agents.

In FIG. 3 in which like parts have like numerals to those in FIGS. 1 and 4, plus 100, structural element 110 comprises in part an inner surface structure 112 having a generally cylindrical surface portion 114 formed with integral ribbing 116 by machining away portions of the surface structure. It will be noted that ribbing 116 is disposed helically about the longitudinal axis of the structural element 110. The structural element 110 further comprises an outer surface structure 120 having a generally cylindrical surface portion 122. Ribbing mounts 124 are formed integrally with the surface structure 120 and define helically extended groove segments 132 opposed to and in registry with the ribbing 116 segments on the inner surface portion 114. In this FIG. 3 embodiment, the mounting of the inner and outer surface structures 112, 120 is by reducing the physical dimensions of the inner surface structure and increasing the physical dimensions of the outer surface structure, e.g. by cooling the former and heating the latter to a temporary temperature condition from their usual persistent temperature condition to achieve thereby a change in relative size such that the inner surface structure can be fitted into the outer surface structure with sufficient mechanical clearance that the structures move easily past each other with the ribbing 116 segments sliding in the groove segments 132. Once so fitted the inner and outer surface structures 112, 120 and the ribbing 116 carried therebetween return to their normal or persistent temperature and consequently contract or expand depending on whether they were previously cooled or heated, and the edges 130 of ribbing 116 further enter the groove segments 132 binding there as the clearance is reduced to zero. The inner and outer surface structures 112, 120 are thus bound together across ribbing 116 without use of adhesive or any bonding agents.

Figure 2:
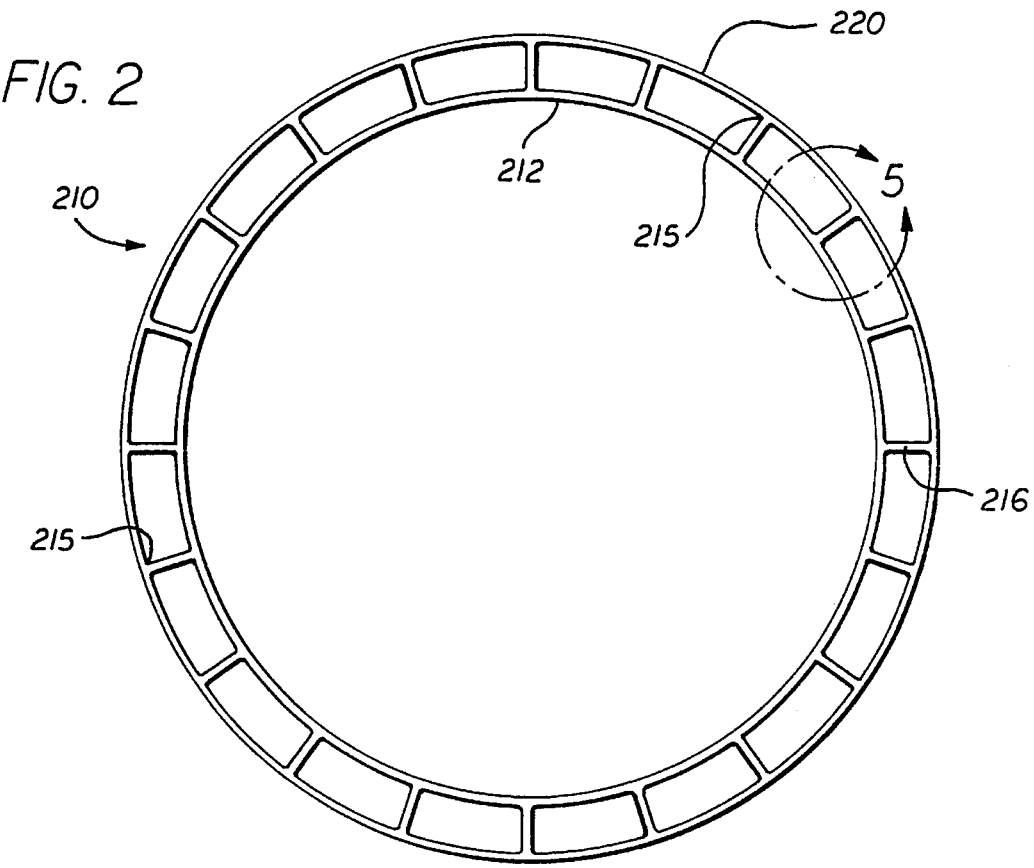
FIG. 2 is a top or bottom plan view thereof.

With reference now to FIGS. 2 and 5, in which like parts are given like numerals to those in FIGS. 1 and 4, plus 200, the structural element 210 has ribbing 216 and inner and outer surface structures 212 and 220 which can any or all be formed of fiber reinforced plastic, e.g. glass or carbon and like filaments 211 may be embedded in epoxy, polyester, urethane, phenolic, polyolefin or styrene or olefin copolymer resins among other resins 213 and shaped into ribbing, inner and/or outer structures which are capable of controlled change between first and second dimensional conditions as by change in temperature of the ribbing, inner or outer structures 216, 212,220, or by passage of the resins through their glass transition temperatures with a resultant change in physical dimensions of the ribbing and/or structures to a temporary condition, enabling their interfitting without binding, followed by a return to their persistent physical dimensional condition in which latter condition the parts are bound together but separable by return to the temporary condition, e.g. along interface 215 where ribbing 216 extends integrally from inner surface structure 212, as in the FIGS. 1 and 4 embodiment. The bead 228 and groove 232 arrangement described above for metal parts can be used in the FIGS. 2 and 5 embodiment with like effect.

It will be noted that the respective heights of the ribbing and the mounts are not critically related but together they are required to bridge the distance by which the surface structures are spaced. The relative heights of the ribbing in different parts of a structural element may be varied for particular effects or design or machining convenience. In the design of structures using the invention bosses may be provided for mounting bolt holes for securing the structural element to other components or vice versa. It is to be noted that provision of the bosses does not require added bolt-on parts as in honeycomb, but these features may be added wherever desired within the capability of the machining apparatus. Further, the separation of the surface structures may be varied by changing the height of the ribbing to provide a tapered or stepped structural element. Desirably in manufacturing, the machining is accomplished to leave relatively more material at the junctions of the ribbing to provide increased compressive strength. Also the interior surface of the surface structures is suitably machined out to reduce material and thus weight and at the same time add rigidity by virtue of the resulting raised ribs. The interconnection of the surface structures with the ribbing is preferably by a self-locking e.g. bead and channel, tongue and groove, slide and slot, etc. or other interfitting/interlocking arrangement in which the engaged parts bodily interfere with separation. With the advent of structural plastics which rival metals for strength per pound, a portion or all of a surface structure can be formed of such plastic in an interlockable form or the engagement of the surface structure can be effected by such plastic.

The foregoing generally described structural element can be fabricated in a number of ways into a wide variety of products, ranging from wings to walls, tanks to beams to bulkheads, and platforms to frameworks.

As will be evident from the foregoing, materials used include metals such as aluminum and titanium or other metals, and plastics and plastic composites of fibers, fillers and resins which have suitable strength, machining characteristics and dimensional response.

The foregoing objects are thus met.

We claim:

1. Structural element comprising opposed first and second axially extended surface structures, a pattern of ribbing extending between and spacing said surface structures, ribbing mounting means on said surface structures in registered relation with said ribbing, said ribbing being mechanically blocked against separation from said ribbing mounting means when said mounting means and ribbing are each at a predetermined temperature condition and mechanically unblocked when said mounting means and ribbing deviate differentially from said predetermined temperature condition.

2. Structural element according to claim 1, in which said first and second surface structures generally lie in parallel planes.

3. Structural element according to claim 2, in which said first and second surface structure planes are congruent.

4. Structural element according to claim 1, in which said first and second surface structures generally lie in cylindrical planes.

5. Structural element according to claim 4, in which said first and second surface structures in said cylindrical planes are congruent.

6. Structural element according to claim 4, in which said first and second surface structures in said cylindrical planes are coaxial.

7. Structural element according to claim 1, in which said ribbing mounting means on at least one of said first or second surface structures is integral with said surface structure.

8. Structural element according to claim 1, in which at least one of said first or second surface structures is locally relieved to define said ribbing mounting means.

9. Structural element according to claim 8, in which both of said first and second surface structures are locally relieved to define said ribbing mounting means.

10. Structural element according to claim 8, in which said ribbing is formed by local relief of said first or second surface structure.

11. Structural element according to claim 8, in which said ribbing comprises individual ribbing segments formed independently of both said surface structures.

12. Structural element according to claim 1, in which said ribbing comprises individual ribbing segments formed independently of both said surface structures.

13. Structural element according to claim 1, in which said first and second surface structures lie in nested cylindrical planes, and said ribbing comprises plural ribbing segments helically disposed between said surface structures in engaged relation with said ribbing mounting means on each surface structure.

14. Structural element according to claim 1, in which said first and second surface structures lie in nested cylindrical planes, and said ribbing comprises circularly disposed plural ribbing segments lying radially of the center longitudinal axis of the inner of said cylindrical planes and between said surface structures in engaged relation with said ribbing mounting means on each surface structure.

15. Structural element according to claim 1, in which said first and second surface structures lie in generally parallel planes, and said ribbing comprises plural ribbing segments disposed generally normal to at least one of said surfaces structures and in engaged relation with said ribbing mounting means.

16. Structural element according to claim 15, in which said ribbing mounting means on at least one of said first or second surface structures is integral with said surface structure.

17. Structural element according to claim 15, in which at least one of said first or second surface structures is locally relieved to define said ribbing mounting means.

18. Structural element according to claim 17, in which both of said first and second surface structures are locally relieved to define said ribbing mounting means.

19. Structural element according to claim 17, in which said ribbing is formed by local relief of said first or second surface structure.

20. Structural element according to claim 17, in which said ribbing comprises individual ribbing segments formed independently of both said surface structures.

21. Structural element according to claim 15, in which said ribbing comprises individual ribbing segments formed independently of both said surface structures.

22. Structural element according to claim 15, in which said mounting means and plural ones of said ribbing segments define interfitting portions.

23. Structural element according to claim 22, in which said ribbing segments have at least one bulbous terminal opposite said mounting means therefor, said mounting means defining a cup-shaped recess congruent with said bulbous terminal and relatively sized with respect thereto such that at the same temperature condition said mounting means and said ribbing terminal engage one another in blocking relation against relative movement but at relatively different temperature conditions said mounting means and said ribbing terminal are relatively movable in unblocked relation.

24. Structural element comprising opposed first and second, axially extended surface structures each having a closed figure pattern of ribbing projecting therefrom toward the opposite surface structure in spaced relation, the ribbing being interposed between said first and second surface structures in freely movable relation responsive to a temporary first relative dimensional condition of said structures, and in blocking relation against separation of said structures responsive to a persistent second relative dimensional condition of said structures.

25. Structural element according to claim 24, in which said structures are dimensionally responsive to heat conditions and said persistent second relative dimensional condition of said structures and ribbing exists at 25° C. and said first relative dimensional condition exists independently in said first and second structure and said ribbing at some other temperature.

26. Structural element according to claim 24, in which said surface structure ribbing defines mounting means, and including also a third ribbing structure bridging the space between said surface structures in registered, mating relation with said surface structure ribbing mounting means.

27. Structural element according to claim 24, in which said third ribbing structure is separately formed from said surface structures.

28. Structural element according to claim 24, in which said third ribbing structure defines a closed figure registerable with said first and second surface structure closed figure patterns of ribbing mounts.

29. Structural element according to claim 24, in which said third ribbing structure closed figure comprises linear segments.

30. Structural element according to claim 24, in which said third ribbing structure closed figure comprises curvilinear segments.

31. Structural element according to claim 24, in which said third ribbing structure is of relatively greater height than said pattern of ribbing on said first or second surface structures.

32. Structural element according to claim 24, in which said surface structure ribbing mounts of at least one of said first and second surface structures defines an outward edge groove into which the opposing outward edge of said third ribbing structure interfits in structural element defining relation.

33. Structural element according to claim 32, in which both of said first and second surface structure ribbing mounts define an outward edge groove to receive said third ribbing structure.

34. Structural element comprising opposed first and second, axially extended, surface structures each having a closed figure pattern of ribbing mounts projecting therefrom toward the opposite surface structure in spaced relation, and a separately formed third ribbing structure shrink-fit-locked between said first and second surface structures.

35. Structural element according to claim 34, in which said third ribbing structure comprises a closed figure of a plurality of linear segments arranged to enclose a space.

36. Structural element according to claim 33, in which said third ribbing structure comprises a closed figure of curvilinear segments arranged about a common point to enclose a space.

37. Structural element according to claim 1, in which said third ribbing structure comprises fiber reinforced plastic.

38. Structural element according to claim 37, in which said first and second surface structures each comprise fiber reinforced plastic and at least one surface structure is integrally formed with said ribbing against unblocking except upon melting of said plastic.

39. A structural element comprising first and second surface structures, one of said surface structures defining a closed pattern of ribbing, the other of said surface structures defining a cooperating pattern of ribbing for locking together said surface structures in spaced relation.

40. The method of supporting opposed surface structures in a structural element, including interposing ribbing between said surface structures in a temporary first relative dimensional condition of said structures and ribbing in interfitting relation, and thereafter returning said surface structures and ribbing to a persistent relative dimensional condition to interlock said structures together across said ribbing by said dimensional change.

41. Structural element comprising opposed first and second, axially extended, surface structures, having a pattern of ribbing mounts projecting therefrom toward the opposite surface structure in spaced relation, and separately formed third structure comprising a closed figure pattern of ribbing mechanically blocked against separation from between said first and second surface structures.

42. Structural element according to claim 41, in which said third structure comprises a plurality of ribbing segments interlocked in third structure defining relation and arranged to bridge the space between said surface structures.

43. Structural element according to claim 41, in which said third structure comprises fiber reinforced plastic.

* * * * *